May 8, 1934.  J. A. WILLOUGHBY  1,957,481
ELECTRICAL INSULATOR
Filed Jan. 19, 1929   2 Sheets-Sheet 1
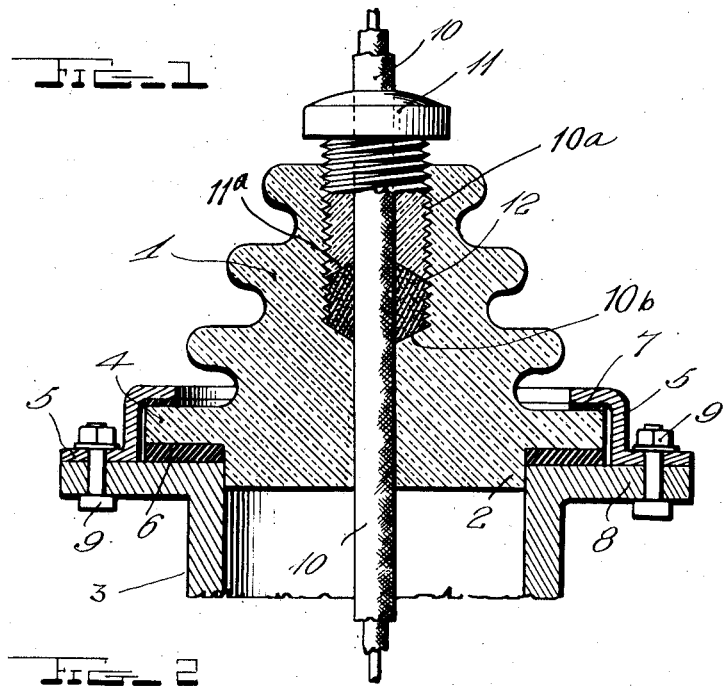
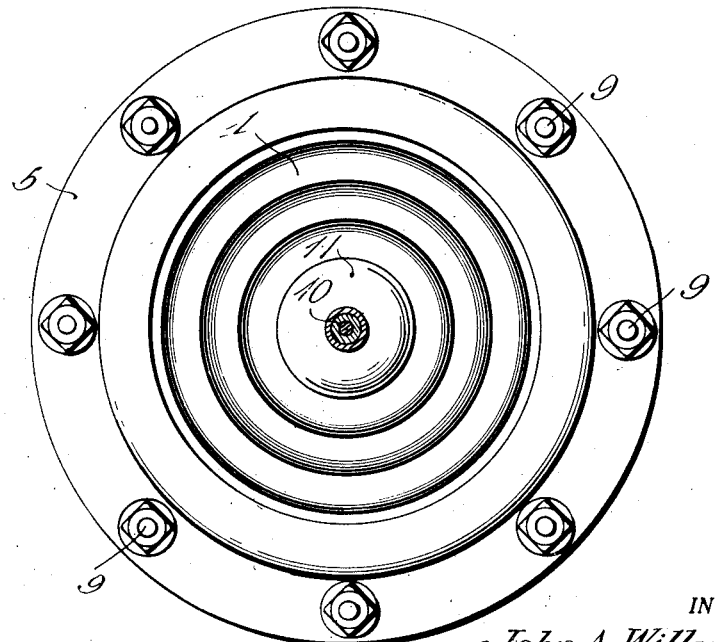
INVENTOR.
John A. Willoughby,
BY
ATTORNEY.

May 8, 1934.  J. A. WILLOUGHBY  1,957,481
ELECTRICAL INSULATOR
Filed Jan. 19, 1929  2 Sheets-Sheet 2
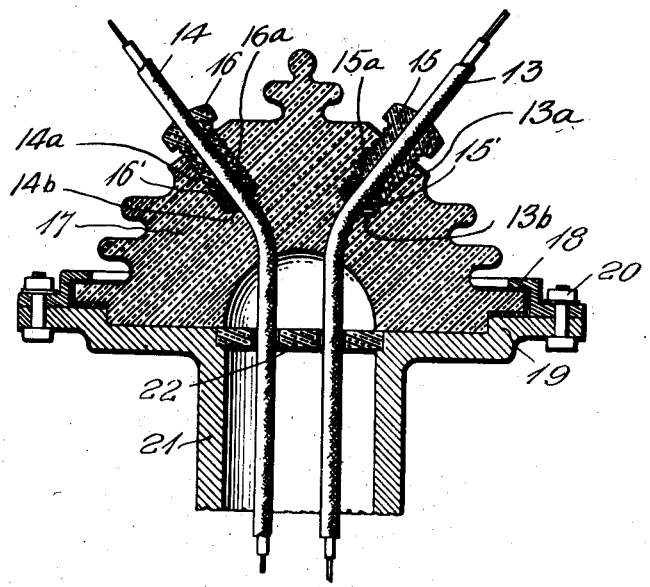
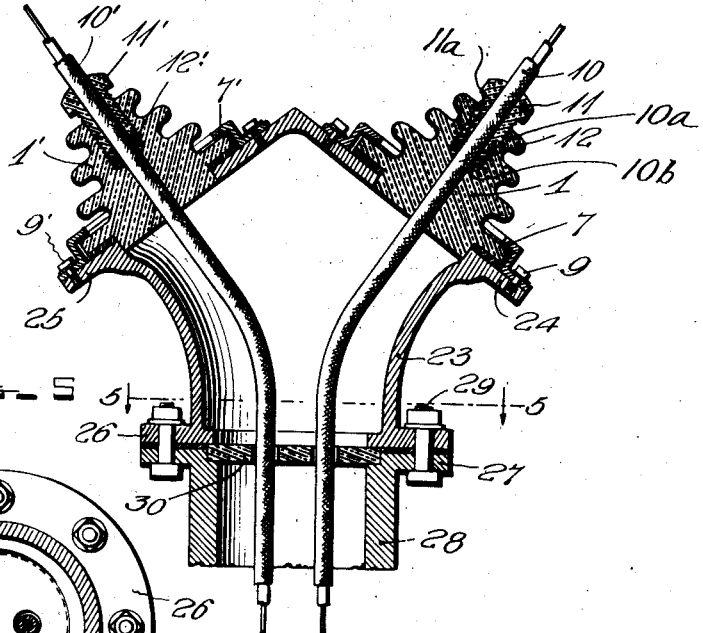
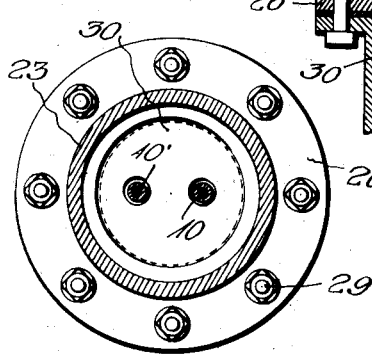
INVENTOR.
John A. Willoughby,
BY
ATTORNEY.

Patented May 8, 1934

1,957,481

UNITED STATES PATENT OFFICE 1,957,481

ELECTRICAL INSULATOR

John A. Willoughby, Cambridge, Mass.

Application January 19, 1929, Serial No. 333,702

2 Claims. (Cl. 247—6)

(Granted under the act of March 3, 1883, as amended April 30, 1928; 370 O. G. 757)

This invention relates broadly to electrical insulators. More specifically this invention relates to electrical insulators of ceramic products.

An object of this invention is to provide a lead in insulator unit wherein all of the parts are of insulating material.

Another object of this invention is to provide a pressure resisting insulator unit wherein all the parts are of readily machinable insulating material.

Still another object of this invention is to provide a water tight lead in insulator unit for receiving a lead in cable wherein all the parts are made of readily machinable insulating material.

According to this invention an electrical cable lead in insulator is made entirely of ceramic products. The current conducting cable is prevented from coming into contact with any metallic parts which have sharply machined edges. Brush discharges and losses occurring because of the brush discharges are practically eliminated in the insulator under normal load and voltage conditions. The electrical conducting cable is inserted through a hole in the insulator unit. A portion of the hole adjacent to the exterior surface of the unit is enlarged to greater dimensions than those of the cable and the walls thereof machined to receive a plug member which also is provided with a hole to receive the cable. The plug member is also of ceramic material. Packing of insulating composition is inserted at the bottom of the enlarged portion of the hole.

After the cable is properly inserted the plug member is tightened into place. The packing material is forced tightly into engagement with the cable and the walls of the insulator unit. Liquids or gases are prevented from passing along the cable from one side of the unit to the other. Where it is desirable to pass several cables through a metallic or other wall especially where liquid or gas exists on one side of the wall and it is not desirable to let it pass along the cable to the other side an insulator unit provided with two or more holes is employed.

In leading several cables through an opening, a Y-shaped member may be provided for supporting several insulator units in spaced positions adjacent to the opening where it is desirable to more effectively insulate the cables from each other or where it is more convenient.

Referring to the drawings, Figure 1 illustrates a cross-sectional view in elevation of the preferred form of this invention; Fig. 2 is a top view illustrating an embodiment of this invention; Fig. 3 is a cross-sectional view in elevation of a modified form of this invention; Fig. 4 is a cross-sectional view in elevation of another modification of this invention and Fig. 5 is a cross-sectional view along the line 5—5 of Fig. 4.

In Fig. 1 of the drawings reference numeral 1 designates the body of the insulator unit. This body may be made of machinable ceramic materials such as certain thoroughly annealed porcelains. Portion 2 is provided to the body 1 to engage with an extremity of the tubular member 3 or with the walls of an opening. A shoulder 4 which is integral with the body is held in engagement with the extremity of the tubular member 3 by an angularly formed ring 5. Packing rings 6 and 7 are provided between the shoulder and the surfaces engaging it to protect the shoulder and prevent it from cracking. This packing material may be canvas impregnated with red lead. Bolts 9 are provided to engage the ring 5 and the flange 8 to firmly hold the insulator unit in place against the tubular member. The cable 10 is drawn through the opening formed in the center of the body of the insulator unit. A threaded plug member 11 is also provided with an opening through which the cable 10 is drawn. The opening in the body of the insulator unit through which the cable is drawn may be advantageously provided with an enlarged portion 10a which terminates in the conical recess 10b reentrant into the body of the insulator unit in the direction opposite the entrance thereto. Plug member 11 is provided with a reentrant conical recess 11a at its inner end, reentrant toward the outer end. The plug member 11 fits into the enlarged portion of the opening in the body of the insulator unit and the conical reentrant surfaces of the plug member and the insulator unit press packing 12 into intimate contact with cable 10 making a tight fit. Packing 12 compressible under pressure, such as asbestos fiber, is provided about the cable 10 between the bottom of the enlarged portion of the opening and the bottom surface of the plug 11. I have found that particularly in locations where lead-in conductors are exposed to water, as on antennas on submarine boats, it is particularly advantageous to employ loose fibrous packing material such as asbestos, and the conical reentrant surfaces between which the fibrous packing material is contained.

In Fig. 3 a modification of this invention is illustrated wherein the body portion of the insulator unit 17 is provided with two cable receiving openings the enlarged portions of which are provided with machined plugs of ceramic material 15 and 16. Current conducting cables 13 and 14 are passed through the openings in the insulator 17 and through openings in the plugs 15 and 16 whereupon the latter are caused to bear down upon the packing 15' and 16' and render the openings through which the cables pass substantially liquid and gas tight. The enlarged portions 13a and 14a of the body apertures, and the inner end of the plugs, may be reentrantly recessed at 13b, 14b, 15a and 16a, as shown. Ring member 18 is firmly held by bolts 20 against the flange 19 and cooperates therewith to firmly hold the insulator unit against the extremity of the tube 21. Cable spacing members 22 of mica or other suitable insulating material are provided to the tube 21 to prevent the cables 13 and 14 from coming against each other or against the tube. Several of these spacing members are employed in cases where long tubes are used for housing lead-in conductors. For example in the case of lead-in conductors of a loop antenna positioned on the outside surface of a submarine the tube housing the lead-in cables is provided at spaced intervals with spacing members similar to members 22.

In Fig. 4 another modification of this invention is shown. In this embodiment of the invention several insulator units 1 and 1' such as illustrated in Fig. 1 are mounted upon flanges 24 and 25 of a Y-shaped member 23. An additional flange 26 is provided to the Y-shaped member 23 whereby the member is firmly held through the co-operation of the bolts 29 and the flange 27 to the tube 28. An insulating member 30 of mica or similar insulating material is provided at the extremity of tube 28 to space the cables 10 and 10'. The spacing member 30 is more clearly illustrated in Fig. 5 of the drawings which is a sectional view along the line 5—5 of Fig. 4.

The invention described herein may be manufactured and used by or for the Government of the United States for governmental purposes without the payment of any royalties thereon.

While I have described my invention in several of its preferred embodiments I realize that other modifications thereof are possible and it is therefore to be understood that this invention is not limited by and to the specific embodiments described in the foregoing specification but by the scope of the annexed claims.

What I claim as new and desire to secure by Letters Patent of the United States is as follows:

1. A tubular conduit having an outstanding annular flange at one end and being internally recessed to form an annular seat, a mica disc having its marginal portions resting in said seat, an insulator having a body of ceramic insulating material formed with an outstanding annular collar near its inner end, a clamping ring releasably secured against the flange of said conduit and having an annular lip overlapping the collar of said insulator to secure the insulator in place with its inner end bearing against the disc, packing rings between the collar and the flange and lip to form a tight joint and prevent cracking of the collar, said disc having openings formed therein and said insulator having its body formed with bores having enlarged outer portions constituting cups, conductors extending through said conduit and outwardly through the openings of the disc and bores of said insulator, compressible packing in said cups, and plugs of insulating material screwed into said cups and formed with axially extending bores through which said conductors extend, said plugs when screwed inwardly serving to compress the packing in inner ends of the cups firmly about the conductors and prevent leakage of gas and liquid through the insulator.

2. A tubular conduit having an outstanding annular flange at one end, the said end having its walls internally recessed to form an annular seat, a mica disc in the said end of said tube having its marginal portions resting in said seat and its outer face flush with the face of the flange, an insulator having a body of insulating material and formed with an outstanding collar near its inner end, said insulator fitting against the said end of said tube and having its inner end face bearing against the flange and marginal portions of said disc, securing means carried by said flange and engaging said collar to releasably hold the insulator and disc in place, conductors extending through said conduit and projecting outwardly through openings formed in the disc and insulator body in spaced relation to each other, and means carried by the insulator body to form gas and water tight joints about said conductors.

JOHN A. WILLOUGHBY.